(12) United States Patent
Exantus

(10) Patent No.: US 11,308,744 B1
(45) Date of Patent: Apr. 19, 2022

(54) WRIST-WEARABLE TRACKING AND MONITORING DEVICE

(71) Applicant: Jimcy Exantus, Naples, FL (US)

(72) Inventor: Jimcy Exantus, Naples, FL (US)

(*) Notice: Subject to any disclaimer, the term of this patent is extended or adjusted under 35 U.S.C. 154(b) by 0 days.

(21) Appl. No.: 17/133,749

(22) Filed: Dec. 24, 2020

Related U.S. Application Data

(60) Provisional application No. 62/954,150, filed on Dec. 27, 2019.

(51) Int. Cl.
*G06F 21/35* (2013.01)
*G07C 9/00* (2020.01)
*H04B 1/3827* (2015.01)

(52) U.S. Cl.
CPC ......... *G07C 9/00563* (2013.01); *H04B 1/385* (2013.01)

(58) Field of Classification Search
CPC ..... G07C 9/00563; H04B 1/385; G06F 21/35; G06F 3/047; G08B 21/0208; G09G 5/003; A61B 5/681; H01L 31/16
See application file for complete search history.

(56) References Cited

U.S. PATENT DOCUMENTS

| | | | |
|---|---|---|---|
| 1,498,126 A * | 6/1924 | Smith | A44C 5/2071 24/578.15 |
| 2,660,103 A * | 11/1953 | Culp | G03B 19/04 396/425 |
| 3,852,853 A * | 12/1974 | Thomas | F16B 2/14 24/650 |
| 5,617,074 A | 4/1997 | White | |
| 5,900,817 A | 5/1999 | Olmassakian | |
| 6,243,039 B1 | 6/2001 | Elliot | |
| 6,326,891 B1 | 12/2001 | Lin | |
| 6,396,403 B1 | 5/2002 | Haner | |
| 7,106,191 B1 | 9/2006 | Liberati | |
| 7,164,354 B1 | 1/2007 | Panzer | |
| 7,259,682 B2 | 8/2007 | Vannerus et al. | |
| 7,545,283 B2 | 6/2009 | Ikemori et al. | |
| 7,733,224 B2 | 6/2010 | Tran | |
| 7,920,066 B2 | 4/2011 | Troxler | |
| 7,925,708 B2 | 4/2011 | Davis et al. | |
| 8,487,773 B2 | 7/2013 | Kang et al. | |
| 8,659,414 B1 | 2/2014 | Schuk | |
| 8,659,421 B2 | 2/2014 | Babineau | |
| 8,684,900 B2 | 4/2014 | Tran | |
| 9,173,087 B2 | 10/2015 | Pallotta | |
| 9,538,725 B2 | 1/2017 | Bianchi et al. | |

(Continued)

*Primary Examiner* — An T Nguyen
(74) *Attorney, Agent, or Firm* — Allen F. Bennett; Bennett Intellectual Property

(57) ABSTRACT

The present invention is directed to a secure tracking and monitoring device that may not be easily taken off by the wearer or by a perpetrator without biometrically authenticated authorization. The secure tracking and monitoring device includes: a smartwatch, the smartwatch including a first computer program product; a first band with a first end attached to the smartwatch; a second band with a first end attached to the smartwatch; a biometric locking device that attaches a second end of the first band to a second end of the second band; a processor, memory, a second computer program product, a wireless transceiver, one or more locking actuators, a battery, and first camera each operatively attached to the biometric locking device; and a gel ring attached to a surface of the biometric locking device.

16 Claims, 8 Drawing Sheets

(56) References Cited

U.S. PATENT DOCUMENTS

| | | |
|---|---|---|
| 9,600,992 B1 | 3/2017 | Kolla et al. |
| 9,734,688 B2 | 8/2017 | Ishii |
| 9,852,597 B2 | 12/2017 | Beaty et al. |
| 9,859,937 B2 | 1/2018 | Chien |
| 9,874,857 B1 * | 1/2018 | Keizer ............ G06T 3/60 |
| 9,892,608 B2 | 2/2018 | Layson |
| 9,898,915 B2 | 2/2018 | Douglas |
| 9,996,166 B2 * | 6/2018 | Stafford ............ A63F 13/213 |
| 10,176,691 B2 | 1/2019 | Smoak |
| 10,176,693 B2 | 1/2019 | Brantley |
| 2004/0155738 A1 * | 8/2004 | Kraus ............ A44C 5/14 335/205 |
| 2007/0247307 A1 | 10/2007 | Riep |
| 2009/0024004 A1 | 1/2009 | Yang |
| 2010/0238033 A1 | 9/2010 | Blumel et al. |
| 2014/0055352 A1 * | 2/2014 | Davis ............ G06F 3/0304 345/156 |
| 2015/0109126 A1 | 4/2015 | Crawford |
| 2015/0126247 A1 * | 5/2015 | Kim ............ H04M 1/72412 455/556.1 |
| 2015/0277557 A1 * | 10/2015 | Raffa ............ G06F 3/04845 345/156 |
| 2016/0026308 A1 * | 1/2016 | Wu ............ G09G 5/00 345/173 |
| 2016/0157590 A1 * | 6/2016 | Anderson ............ H04B 1/385 224/267 |
| 2016/0283809 A1 * | 9/2016 | Rice ............ H04N 5/33 |
| 2016/0379460 A1 | 12/2016 | Barker et al. |
| 2017/0061424 A1 * | 3/2017 | Dent ............ G06Q 20/382 |
| 2017/0332963 A1 * | 11/2017 | Murakami ............ A61B 5/681 |
| 2018/0025605 A1 * | 1/2018 | Thomas ............ G07C 9/257 455/90.1 |
| 2018/0157817 A1 * | 6/2018 | Gao ............ H04W 12/08 |
| 2018/0303416 A1 * | 10/2018 | Juang ............ A61B 5/02438 |
| 2018/0353085 A1 | 12/2018 | Olivero |
| 2019/0004169 A1 | 1/2019 | Watkins et al. |

* cited by examiner

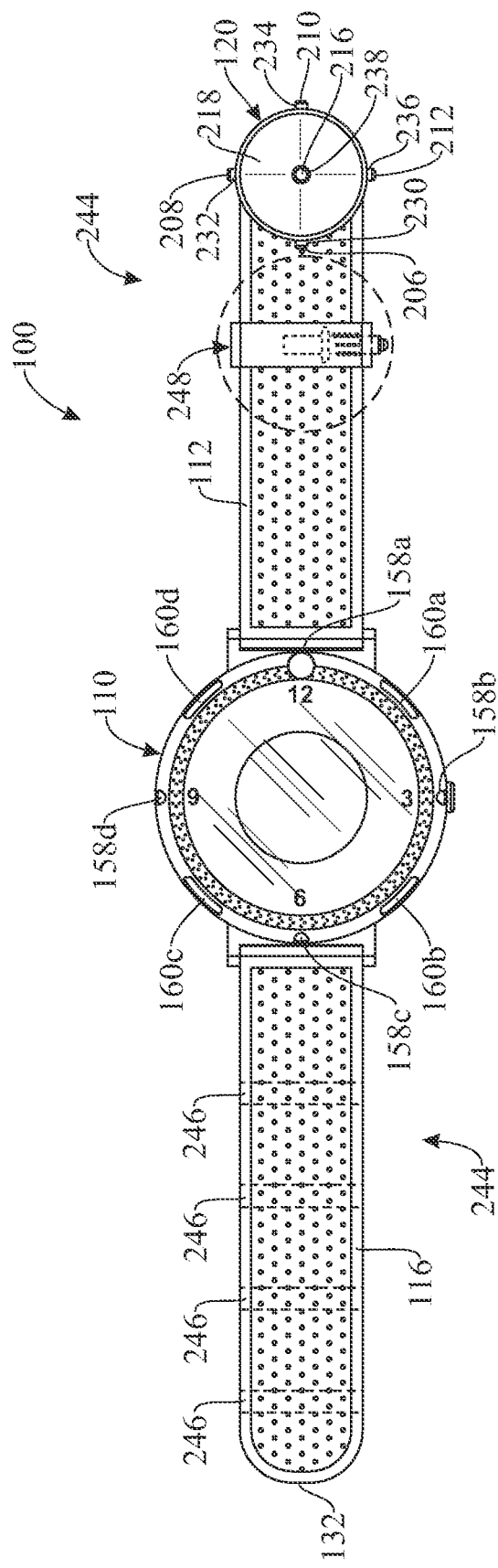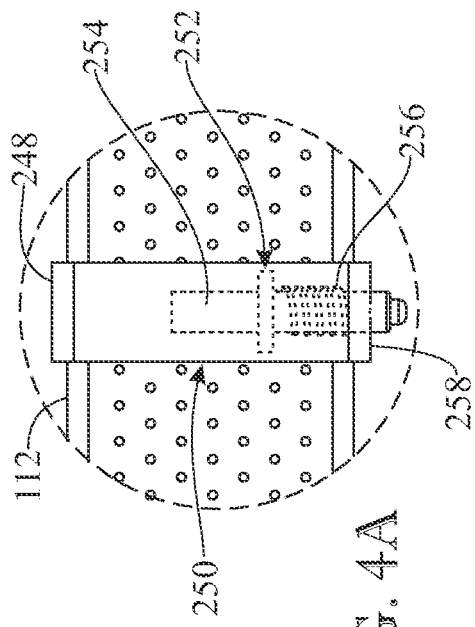
FIG. 4
FIG. 4A

WRIST-WEARABLE TRACKING AND MONITORING DEVICE

CROSS-REFERENCE TO RELATED APPLICATION

This application claims the benefit of U.S. Provisional Patent Application No. 62/954,150, filed on Dec. 27, 2019, which is incorporated herein by reference in its entirety.

FIELD OF THE INVENTION

The present invention relates generally to portable monitoring and tracking devices, and more particularly to a wearable tracking and monitoring device with biometric locking features.

BACKGROUND OF THE INVENTION

Child welfare is a main concern of parents everywhere. The ability to keep track of a child's location and monitor their welfare is paramount to good parenting. This is particularly true in this modern age where both parents, or a single parent or caregiver, work and are away from the home, school, daycare or other location of the child. Knowing that the child is safe, secure and healthy is a concern of every parent or caregiver.

Should a child wonder off or become lost or separated from his parents or caregiver, the stress experienced by the parent or caregiver can be intolerable. Additionally, the costs in terms of manpower to recover the child by emergency or law enforcement personnel can be significant to society.

The problem of children becoming lost, separated or abducted is of great relevance and, unfortunately, extremely frequent. According to some statistics, every 40 seconds a child becomes missing or abducted in the United States, which is equivalent to approximately 800,000 children being reported missing every year.

Furthermore, the problem of persons needing care is not limited to just children. Adults or adolescents with mental disabilities also face the problem of getting lost or separated and cause great anguish to their parents, adult children, or other caregivers. For example, there are approximately 125,000 search-and-rescue missions where volunteer teams are deployed for missing Alzheimer's patients every year.

In an attempt to help solve or mitigate the problems above, the use of tracking and monitoring devices is growing in popularity. However, current tracking devices are easily removed from the wearer, making the devices unreliable for monitoring or tracking a child or other person needing monitoring. For instance, tracking and monitoring systems built into an article of clothing (e.g., shoe) or a wearable accessory or device (e.g., smartwatch, bracelet) are known in the art. Unfortunately, article of clothing or wearable accessories or devices can easily be taken off or discarded by the wearer or by a perpetrator rendering the tracking device ineffective. A parent or guardian is unable to track a child if the child, or even a perpetrator, removes the tracking device.

Accordingly, there remains a need for a solution to at least one of the aforementioned problems. For example, there is an established need for a secure tracking and monitoring device that is not easily taken off by the wearer or a perpetrator.

SUMMARY OF THE INVENTION

The present invention is directed to a secure tracking and monitoring device that can be lockably secured to a wearer's wrist to prevent unauthorized removal. The secure tracking and monitoring device includes a smartwatch have various visual, auditory, location and other monitoring systems capable of generating and sending data to a central location or authorized personal. The smartwatch has a first and second wrist straps to hold the smartwatch on the wrist of the wear. The secure tracking and monitoring device further includes a biometric locking and security device that locks the straps of the smartwatch about the wearer's wrist and is only operable by an authorized user. In some embodiments, the biometric locking and security device includes an anti-removal locking system which may only be unlocked by an authorized user. In some embodiments, the biometric locking and security device may be secured without activating the anti-removal locking system, in which case the device may provide a sensory alert indicating the anti-removal locking system has not been activated. The biometric locking and security device include biometric monitoring functions to monitor the wearer's bodily biometrics as well as conditions in the surrounding environment.

In a first implementation of the invention, a secure tracking and monitoring device comprises:

a smartwatch, the smartwatch including a first controller containing a first computer program and at least one camera;

a first band with a first end attached to said smartwatch;

a second band with a first end attached to said smartwatch;

a biometric locking device that attaches a second end of said first band to a second end of said second band and includes a second controller containing a second computer program; and one or more locking actuators contained in said biometric locking device and at least one biometric probe operatively attached to the biometric locking device, wherein said biometric locking device engageable with said first and second strap to secure said first and second strap together in response to a biometric input and release said second strap from said first strap in response to a subsequent biometric input.

In a second aspect, smartwatch may include an upper housing half and a lower housing half, the at least one camera being positioned in the lower housing half.

In another aspect, the lower housing half may include a plurality of cameras.

In another aspect, the lower housing half may include a plurality of lights for illuminating areas viewed by the plurality of cameras.

In another aspect, the smartwatch may include a control panel in the upper housing half.

In yet another aspect, the control panel may include a touch screen.

In another aspect, the upper housing half may include a plurality of cameras.

In another aspect, the plurality of cameras in the upper housing half may be oriented at an angle of 45 degrees relative to a plane defined by the control panel.

In another aspect, the lower housing half may include a bottom panel having a recess to accommodate a bone of a wearer.

In yet another aspect, the recess may include a gel lining or wall.

In another aspect, the first and second straps may be perforated with holes to increase airflow there through.

In another aspect, the biometric locking device may include a plurality of biometric probes.

In another aspect, the biometric locking device may include a camera associated with each of the biometric probes.

In yet another aspect, the biometric locking device may include a recessed upper sensor surface for receipt of biometric information from an authorized user.

In another implementation of the invention, a secure tracking and monitoring device comprises:

a smartwatch, the smartwatch including a first computer program product;

a first band with a first end attached to said smartwatch;

a second band with a first end attached to said smartwatch;

a biometric locking device that attaches a second end of said first band to a second end of said second band; and a processor, memory, a second computer program product, a wireless transceiver, one or more locking actuators, a battery, and a first camera each operatively attached to said biometric locking device.

In another aspect, the secure tracking and monitoring device may further include a second camera, a third camera, a fourth camera, and a fifth camera on one or more sides of the biometric locking device each operatively coupled to said biometric locking device.

In another aspect, the secure tracking and monitoring device may further include a first gel ring attached to a surface of the biometric locking device.

In another aspect, the secure tracking and locking device may further include a second gel ring attached to a surface of said smartwatch.

In yet another aspect, the smartwatch may further comprise a sixth camera, a seventh camera, and an eighth camera.

In another aspect, the biometric locking device may trigger actuation of the one or more locking actuators based on a biometric reading of the smartwatch or the biometric locking device.

In another aspect, the second computer program product of the biometric locking device may share data with the first computer program product of the smartwatch.

In another aspect, one or more of the first camera, the second camera, the third camera, the fourth camera, or the fifth camera may be night vision (infrared) cameras.

In yet another aspect, images may be produced by a combination of infrared and visible spectrum light cameras.

In another aspect, a camera may be located in the center of the biometric locking device which allows parent/guardian and/or law enforcement officials to identify an individual attempting to remove a bracelet device or smartwatch device.

In another aspect, the combination of cameras may virtually eliminate blind spots by creating a 360-degree view of an area surrounding the biometric locking device or a person wearing the biometric locking device.

In another aspect, the biometric locking device may include a camera probe device that raises above a leveled surface and can rotate 360 degrees to canvas a surrounding environment providing view angle images while a person is sleeping or in an unusual position.

In yet another aspect, when geographical deviation from an approved route by a predetermined amount has occurred, a display associated with the biometric locking device may display one or more colors indicating a community or area the user is from.

In another aspect, the secure tracking and monitoring device may further detect shaking, perspiration, temperature, pulse, and/or blood pressure of an individual wearing the device.

In another aspect, the secure tracking and monitoring device may further comprise a break-away band that detects tampering and assess the level of resistance, when the level of resistance has exceed a predetermined threshold, the band will begin the break-away process.

In another aspect, after an unauthorized break-away process starts, an alert with high importance may be sent to multiple individuals including parents, siblings, and law enforcement officers reporting the unauthorized tampering.

In yet another aspect, the alert may additionally provide images associated with a scene surrounding the tampering.

In another aspect, after an unauthorized break-away process starts, drones may be employed to a current location of the secure tracking device for immediate response and surveillance of the area.

In another aspect, after an unauthorized break-away process starts a security determination may be made about a position and/or location of the individual wearing the secure tracking and monitoring device.

In another aspect, a determination may be made about a position and/or location of the individual wearing the secure tracking and monitoring device.

In yet another aspect, a determination may be made about a number of attempts within a predetermined time window.

In another aspect, the biometric locking device may break-away on arrival of drones and/or shortly after law enforcement agencies.

In another aspect, the biometric locking device may inform a parent/guardian of the temperature of the surrounding environment of a wearer of the biometric locking device.

In another aspect, looking at a device or smartwatch secured by the biometric locking device may visually inform one or more individuals of a deviation from a route, path, or location.

In yet another aspect, a smartwatch secured by the biometric locking device may release a beam from the panic button and/or a user interface that can be seen from a predetermined distance in order to easily visually locate a child in a crowd of children and/or people.

In another aspect, a smartwatch secured by the biometric locking device may release a beam that can be seen even when submerged in water at a predetermined depth.

In another aspect, a smartwatch secured by the biometric locking device may be voice-activated allowing voice commands to control functions associated with the smartwatch and the biometric locking device.

In another aspect, a smartwatch secured by the biometric locking device may only recognize preprogrammed voices of a user and/or a parent/guardian for administration control functions.

In yet another aspect, a smartwatch secured by the biometric locking device may recognize one more non-preprogrammed voices for accessing certain medical information of a user.

In another aspect, a smartwatch secured by the biometric locking device may detect a stressful environment internal to the wearer or external to the wearer and show a default help screen to the user in order to make assistance immediately available.

In another aspect, for comfort purposes, the back of the smartwatch may have an indentation that is aligned with the wearer's outer ulna to creating a comfort fit.

In another aspect, the indentation may consist of a form-fitting material that molds itself to the shape of the ulna bone.

In yet another aspect, the gel-like material may transfer heat and may be cool to the touch to prevent uncomfortable perspiration.

In another aspect, a face of the smartwatch may be leveled with the wrist as a result of the indentation on the back of the smartwatch.

In another aspect, a smartwatch secured by the biometric locking device may utilize a dual battery system and a solar collector.

In another aspect, a smartwatch secured by the biometric locking device may use solar energy harnessed during daytime hours to charge a first battery and/or a second battery, one battery may be recharged by solar power while the other battery is being used as a primary power source.

In yet another aspect, wireless charging capabilities may allow charging of one or more batteries wirelessly when the smartwatch or the biometric locking device is within a wireless charging radius.

In another aspect, a slumber bracelet may function as a sleep monitoring agent for a toddler, child, teen, adult, or the aged.

In another aspect, sonar capabilities may be utilized by a smartwatch secured by the biometric locking device to assist in a speedy recovery and aiding of a child lost at sea.

In another aspect, a walk-with-me feature may be used to assist the blind.

In yet another aspect, a smartwatch secured by the biometric locking device may alert users when objects are within a certain distance and/or when they are within a predetermined distance; sounds may change as an object's distance changes.

In another aspect, a smartwatch secured by the biometric locking device may inform or report to one or more registered users how deep a child is submerged in or under water while also monitoring and reporting vital signs of the submerged child.

In another aspect, a smartwatch secured by the biometric locking device may compute and relay information to a parent/guardian if dangerous and/or unsafe conditions are calculated to transpire or are in progress.

In another aspect, a smartwatch secured by the biometric locking device may utilize sonar capabilities.

In yet another aspect, a smartwatch secured by the biometric locking device may deploy multiple beams of light that can be seen under water from a predetermined distance from the surface to a location of a user's device.

In another aspect, a smartwatch secured by the biometric locking device may contact one or more predetermined individuals that have agreed to respond to a call of distress, help remove them from a negative environment, and/or provide them with positive advice.

In another aspect, a smartwatch secured by the biometric locking device may monitor if a parent/guardian/friend or family member is being rotated in a timely manner to prevent bed sores.

In another aspect, a smartwatch secured by the biometric locking device may automatically notify a parent/guardian and/or individual responsible for monitoring a patient when a predefined period for care has expired or elapsed without the service performed.

In yet another aspect, a smartwatch secured by the biometric locking device may store historical patient data and give access to the stored data to a parent/guardian and/or individual.

In another aspect, a smartwatch secured by the biometric locking device may connect multiple users to public and/or private chats, locations, activities, or venues.

In another aspect, a smartwatch secured by the biometric locking device may restrict movement of a user based on an automated trust plan with predetermined rules, rewards, and consequences.

In another aspect, a smartwatch secured by the biometric locking device may help to promote good behavior and positive character traits.

In yet another aspect, a smartwatch secured by the biometric locking device may connect a user with law enforcement/medical personnel while concurrently maintaining a line of communication with a parent/guardian.

In another aspect, a smartwatch secured by the biometric locking device may analyze a user's heartbeat, and other data relating to the body of the user to determine if a stressful situation or environment is emanate or in process, a bypass process may be automatically enabled allowing for panic status functions to be activated without authorization from a parent/guardian.

In another aspect, a smartwatch secured by the biometric locking device may address short comings in an educational system.

In another aspect, a smartwatch secured by the biometric locking device may use extensions to connect to other devices.

In yet another aspect, a smartwatch secured by the biometric locking device may make report cards available to parent/guardian immediately upon release from educational institution.

In another aspect, a smartwatch secured by the biometric locking device may use an incentive/rewards package to promote use of the smartwatch.

In another aspect, a smartwatch secured by the biometric locking device may report a child's progress or stagnation.

In another aspect, a smartwatch secured by the biometric locking device may receive and give access to reports/documentation from an educational institution.

In another aspect, a smartwatch secured by the biometric locking device may create a platform that allows teachers to instantly communicate with parent/guardian.

In another implementation, a secure tracking and monitoring device, wearable on a wrist, may include a watch, a first band and a second band. The first band may have a first end and an opposite, second end. Similarly, the second band may have a first end and an opposite, second end. The first ends of the first and second bands may be attached to the watch. The device may further include a biometric locking device comprising one or more biometric sensors configured to detect a biometric characteristic of a subject and responsively generate a biometric input. The one or more locking actuators may be configured to selectively adopt a locked position and an unlocked position. In the locked position, the one or more locking actuators may disconnectably attach the second end of the first band to the second end of the second band. In the locked position, the one or more locking actuators may instead not attach the second end of the first band to the second end of the second band. The device may further include at least one controller comprising at least one processor and at least one memory. The at least one memory may store processor-executable instructions configured to cause the at least one processor to execute the operations of: receiving a biometric input generated by the one or more biometric sensors; comparing the received biometric input with a specific biometric input stored in the memory, the specific biometric input corresponding to an authorized subject; and, if the received biometric input matches the specific biometric input, operating the one or more locking actuators to switch between the locked position and the unlocked position.

In another aspect, the one or more biometric sensors may be configured to detect at least one of a fingerprint, a face, an image, a retina, a barcode, and a voice.

In another aspect, the one or more biometric sensors may include at least one biometric sensor on the watch.

In another aspect, the one or more biometric sensors may include at least one biometric sensor at the second end of the second band.

In yet another aspect, the biometric locking device may include a housing at the second end of the second band. The housing may include said at least one biometric sensor which is arranged at the second end of the second band.

In another aspect, the biometric sensors on the housing may include a plurality of cameras arranged around the housing.

In another aspect, the biometric sensors on the housing may include a plurality of biometric sensors arranged around the housing.

In another aspect, the biometric sensors on the housing may include a top central camera comprised at a top, central area of the housing.

In yet another aspect, the biometric sensors on the housing may include a top central biometric sensor comprised at a top, central area of the housing.

In another aspect, at least one biometric sensor may be located at a top, recessed surface of the housing.

In another aspect, the device may further include a keeper carried by the second band. The keeper may be configured to secure the first band to the second band independently of the biometric locking device.

In another aspect, the keeper may include a spring-loaded rod configured to selectively couple with a plurality of openings formed along the first band.

In yet another aspect, the watch may include a first plurality of cameras disposed in spaced-apart relationship about a periphery of the watch.

In another aspect, the device nay further include one or more lights configured to illuminate a field of view of the first plurality of cameras.

In another aspect, the one or more lights may include a first plurality of lights. Each light of the first plurality of lights arranged between a respective pair of adjacent cameras of the first plurality of cameras.

In another aspect, the watch may further include a second plurality of cameras and a second plurality of lights disposed in spaced-apart relationship about a periphery of the watch. Each light of the second plurality of lights may be arranged between a respective pair of adjacent cameras of the second plurality of cameras. The second plurality of lights and second plurality of cameras may be arranged in vertical alignment and below the first plurality of lights and first plurality of cameras, respectively. The first plurality of cameras may be oriented upward and radially outward of the watch and the second plurality of cameras may be oriented radially outward of the watch.

In another aspect, the watch may further include a screen and an annular speaker output disposed around the screen.

In yet another aspect, the device may further include at least one wireless transceiver providing wireless digital communication between the at least one controller and an external electronic device.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIG. 4 presents a top plan view of the secure tracking and monitoring device of FIG. 1;

FIG. 4A presents an enlarged area of detail view of FIG. 3;

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a secure tracking and monitoring device that is not easily taken off by the subject or wearer, which may be a child or an adult, or by a perpetrator, without biometrically authenticated authorization.

Figure 1:
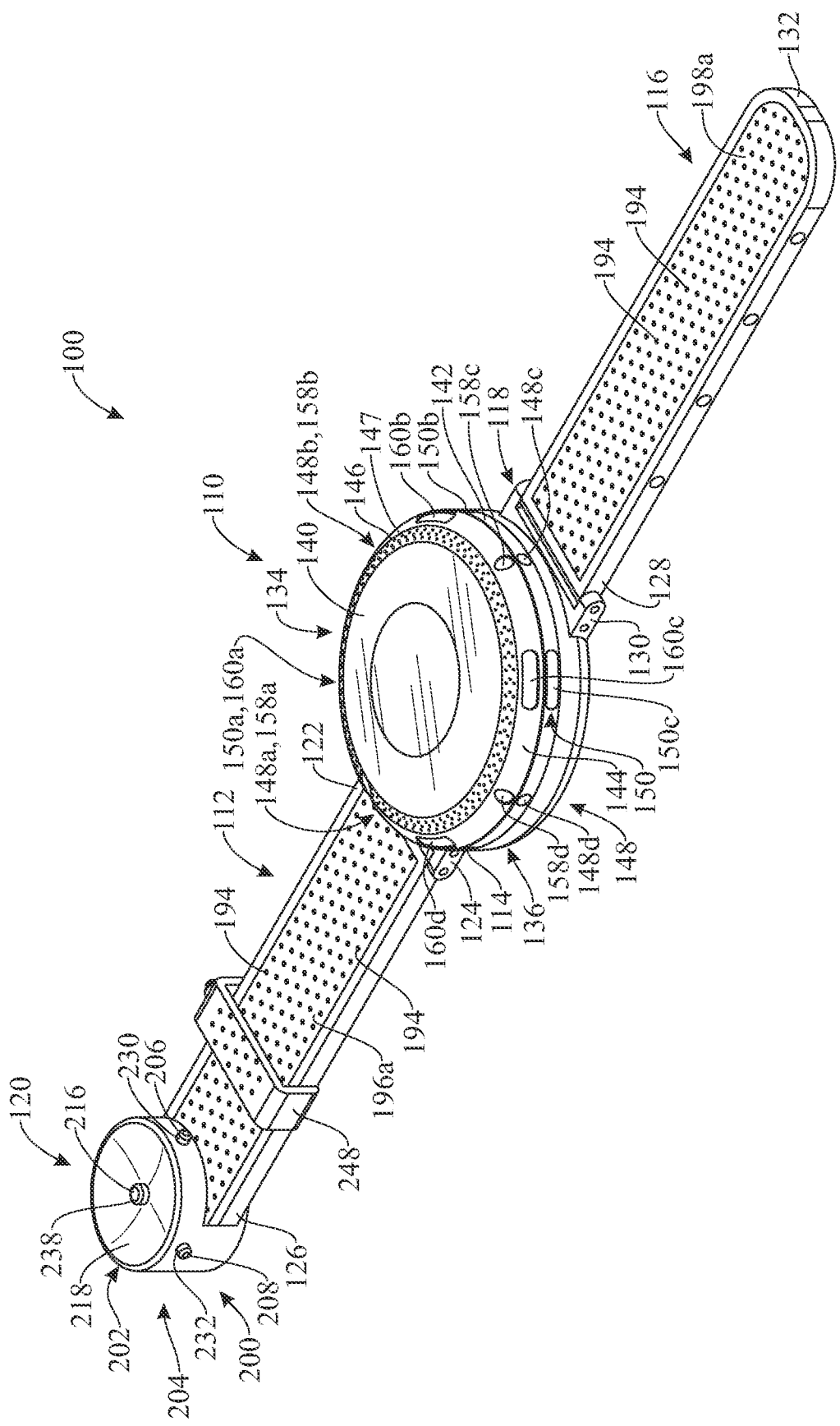
FIG. 1 presents a top isometric view of a secure tracking and monitoring device in accordance with an illustrative embodiment of the present invention.
Figure 2:
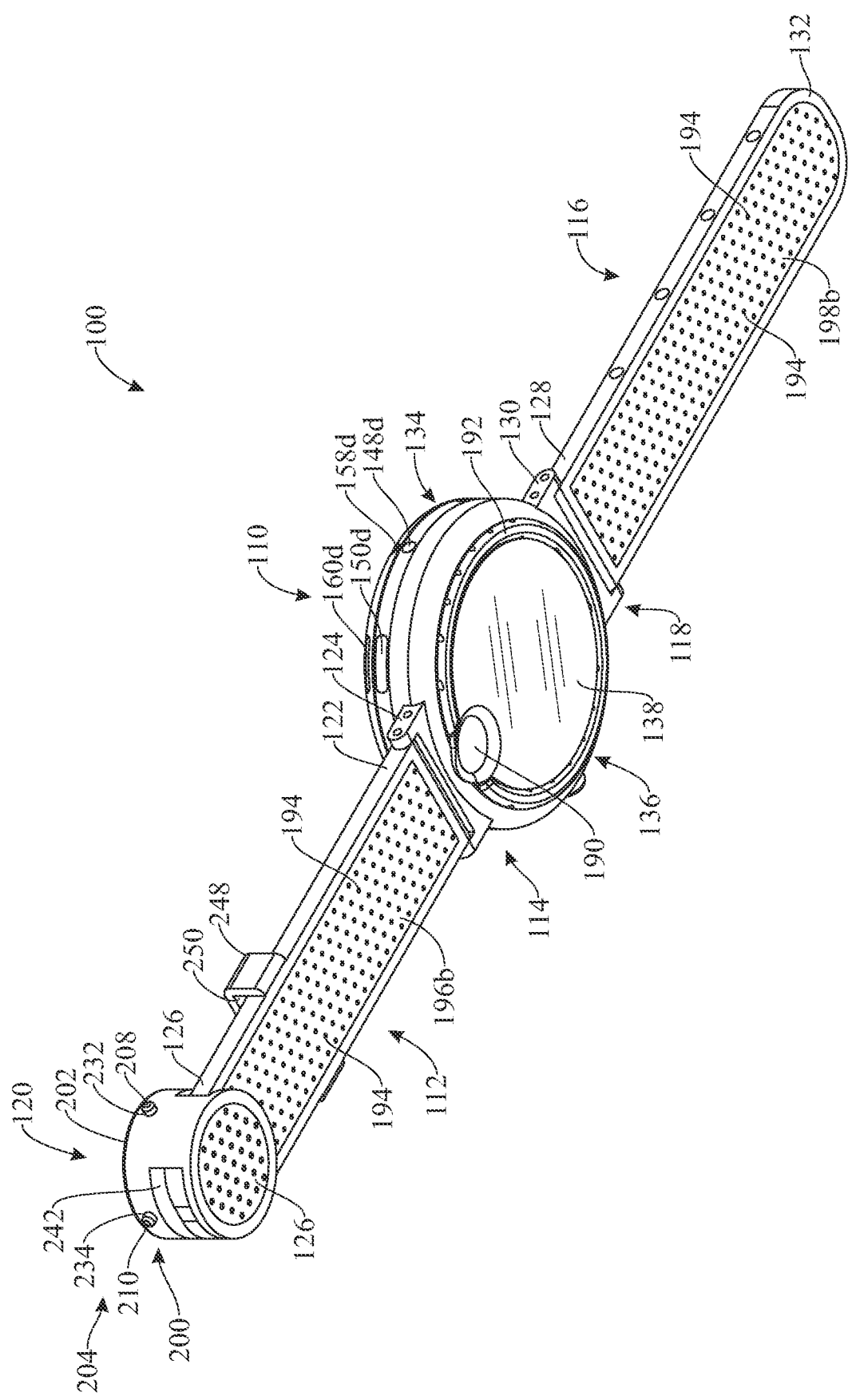
FIG. 2 presents a bottom isometric view of the secure tracking and monitoring device of FIG. 1.

Referring initially to FIGS. 1 and 2, a secure tracking and monitoring device 100 is illustrated in accordance with an exemplary embodiment of the present invention, configured as a biometrically secured, wrist worn tracking device and smartwatch. As shown, the secure tracking and monitoring device 100 may generally include a subject tracking and monitoring smartwatch 110 having a first band 112 extending from a first edge or side 114 of the smartwatch 110 and a second band 116 extending from a second edge or side 118 of the smartwatch 110 and a biometric locking and security device or biometric locking device 120 releasably securing the first and second bands 112 and 116, respectively, to each other.

The biometric locking device 120, inter alia, secures and prevents an unauthorized person from separating the first and second bands 112 and 116 and thus prevents unauthorized removal of the smartwatch 110 from the wearer. The biometric locking device 120 may be permanently affixed to one of the first and second bands 112 and 116 respectively, or may be removably attached to both of the first and second bands 112 and 116. A first end 122 of the first band 112 is movably affixed to a first mount 124 extending from the first side 112 of the smartwatch 110. In the present embodiment, the biometric locking device 120 is fixedly mounted to a second end 126 of the first band 112. Similarly, a first end 128 of the second band 116 is movably affixed to a second mount 130 extending from the second side 118 of the smartwatch 110. The second band 116 includes a second or free end 132 engageable by the biometric locking device 120 in a manner described in more detail hereinbelow.

The smartwatch 110 includes an annular housing having an upper housing half 134 and a lower housing half 136. As shown in FIG. 2, a flat bottom or subject engaging base panel 138 extends across the lower housing half 136. In turn, as shown in FIG. 1, a control panel 140 extends across the upper housing half 134 of the smartwatch 110. The control panel 140 may include a screen providing video or other visual information. The control panel 140 may further include a user-operable interface such as, but not limited to, a touch panel or touch screen (which may be the same, as shown, or different to the screen providing the video or other visual information), to operate the various function of the smartwatch 110 described hereinbelow. The smartwatch 110 houses, among other items, a controller 270 (FIG. 5) which functions as a watch and may include various additional features such as, but not limited to, a global positioning system (GPS) or other geolocation system, camera controllers and data base features, biometric diagnostic features, communications systems, alarm systems, etc.

With specific reference to FIG. 1, the upper housing half 134 includes a lower portion 142, an upper portion 144 and an annular ring 146 positioned between the control panel 140 and the upper portion 144 of the upper housing half 134. The annular ring 146 may comprise orifices 147 for the passing therethrough of sound emitted by an optionally annular speaker/microphone system located beneath, inside or adjacent to the annular ring 146. The speaker/microphone system is in communication with a communications device such as a wireless transmitter or transceiver 274 (FIG. 5) associated with the controller 270.

The lower portion 142 of the upper housing half 134 may include a first series of cameras 148 positioned along or around the lower portion 142 of the upper housing half 134 to view the area around the wearer for safety. A first series of lights 150 are also positioned along or around the lower portion 142 of the upper housing half 134 to illuminate the area around the smartwatch 110 for the series of cameras 148. In this embodiment the first series of cameras 148 includes four, equally spaced cameras 148a, 148b, 148c and 148d that are positioned 90 degrees apart around the lower portion 142. In this embodiment, the first series of cameras 148, i.e. the four equally-spaced cameras 148a, 148b, 148c and 148d, are located at the 12:00, 3:00, 6:00, and 9:00 o'clock positions about the lower portion 142 of the upper housing half 134. The first series of cameras 148 are oriented to view out to the sides of the smartwatch 110 and generally parallel to a plane defined by the control panel 140. The first series of lights 150 of the present embodiment similarly includes four lights 150a, 150b, 150c and 150d which are located intermediate the cameras 148a, 148b, 148c and 148d and are also spaced apart 90 degrees about the lower portion 142 of the upper housing half 134. For instance, the lights 150a, 150b, 150c and 150d may be located at the 1:30, 4:30, 7:30, and 11:30 o'clock positions about the lower portion 142 of the upper housing half 134. The cameras 148a, 148b, 148c and 148d can capture images in a full 360° circle about the smartwatch 110 for the safety of the wearer. The cameras 148a, 148b, 148c and 148d can be of various types including still cameras, motion or video cameras or a combination thereof. The lights 150a, 150b, 150c and 150d can be of various types including LED, Black LED, infrared, etc. and illuminate the area around the smartwatch 110 and are activated in sync with the cameras 148a, 148b, 148c and 148d.

The upper portion 144 of the upper housing half 134 may similarly include a second series of cameras 158 which may be positioned directly above the first series of cameras 148, and a second series of lights 160 which may be positioned directly above the first series of lights 150 such that the first and second series of cameras 148 and 158 operate as pairs, and the first and second series of lights 150 and 160 operate as pairs. The upper portion 144 of the upper housing half 134 is beveled, or sloped inward, such that it faces sideways and slightly upwards relative to the control panel 140. In a preferred embodiment, the upper portion 144 is angled at approximately 45° relative to the plane defined by the control panel 140 so that the second set of cameras 158 can view upwardly as well as outwardly to capture images in front of the smartwatch 110 as well as out to the sides of the smartwatch 110. This upward viewing of the second set of cameras 158, in combination with the full sideways viewing of the first set of cameras 148, allows the smartwatch 110 to fully capture images of the entire area surrounding the smartwatch 110. The second set of cameras 158 includes cameras 158a, 158b, 158c and 158d while the second set of lights 160 includes lights 160a, 160b, 160c and 160d.

The first and second series of cameras 148 and 158, respectively, are used to identify the surroundings of the wearer while standing, seated or lying down and may rotate or zoom in and out to a desired view. The operation of the first and second series of cameras 148 and 158 as well as the first and second series of lights 150 and 160 are controlled by the controller 270 located within the smartwatch 110. In some embodiments, the upper housing half 134 and lower housing half 136 may be rotated relative to one another, such as responsively to a remote user command (e.g., from a parent's phone) to accommodate the view provided by the cameras.

Referring for the moment to FIG. 2, it can be seen that the flat base panel 138 in the lower housing half 136 may include a recess 190 for receiving the outer ulna of the wrist bone of the wearer for comfort. The recess 190 may be formed from or formed to include a gel panel or lining to increase the comfort of the wearer. The flat base panel 138 can be made of a clear or transparent, non-gel (i.e., rigid) material and may be surrounded by raised annular ridges 192 made of a gel material to provide comfort for the user and breathability between the flat base panel 138 of the smartwatch 110 and the wrist of the wearer.

With continued reference to FIGS. 1 and 2, for the further comfort of the user the first and second bands 112 and 116, respectively, may be perforated having wrist band through holes 194 to increase airflow towards the skin of the user. The opposite sides or portions 196*a*, 196*b* and 198*a*, 198*b* of the first and second bands 112 and 126, respectively, containing the through holes 194 are recessed to further increase the airflow and thus breathability to the wrist of the wearer. The first and second bands 112 and 116 should be soft, comfortable and usable while the child is sleeping, and yet durable.

Turning now to FIGS. 1-4, the biometric locking device 120 includes a series of biometric sensors or probes 200 positioned about a cylindrical housing 202 of the biometric locking device 120. A series of cameras 204 are associated with and surround the biometric probes 200. Together, the biometric probes 200 and the associated cameras 204 form an authorization or identification system to ensure that only authorized parties are able to activate and lock or unlock the biometric locking device 120 from the first and second bands 112 and 116. This prevents unauthorized removal of the secure tracking and monitoring device 100 from the wrist of the wearer. Additionally, the series of biometric probes 200 include various monitoring devices to monitor the wearer's vital bodily functions as well as surrounding environmental conditions described in greater detail hereinbelow. For example, in some embodiments, the biometric probes 200 are configured to monitor the wearer's heart rate and temperature and, optionally, the surrounding air temperature. The biometric probes 200 may additionally include a pressure sensor for detecting unsafe air pressures as well as fluid pressure in the case of water immersion and potential drowning.

The biometric probes 200 and the cameras 204 may include or provide fingerprint detection, facial recognition, image recognition (for badges, ID cards, etc.), retinal scan, barcode scan, voice activation or other similar unique identifier devices. The biometric locking device 120 may include a controller 276, which may include a processor, a memory, and/or a transmitter and/or transceiver, wherein the controller 276 is in communication with the controller 270 (FIG. 5) of the smartwatch 110. In this embodiment, the biometric probes 200 include four probes 206, 208, 210 and 212 positioned equally around a side 214 of the cylindrical housing 202 of the biometric locking device 120, and a fifth probe 214 located in the center of an upper recessed sensor surface 218 of the cylindrical housing 202. A parent or authorized user's finger may be pressed into the recessed sensor surface 218 of the cylindrical housing 202 to unlock or lock the biometric locking device from the second band 116. The series of cameras 204 includes five cameras 230, 232, 234, 236, and 238 corresponding to and located with the five probes 206, 208, 210, 212 and 216, respectively. The camera/probe combinations rise above the surrounding surfaces of the cylindrical housing and can view/sense 360 degrees about the cylindrical housing 202 of the biometric locking device 120 to canvas the surrounding environment to identify hazards and dangers as well as authorized users. This is particularly necessary as the wearer may move among many awkward and unusual positions, such as, but not limited to, lying down while sleeping, etc. In some embodiments, lights may be associated with the camera/probe combinations to better illuminate the surrounding and viewed areas. It should be noted that the cylindrical housing 202 of the biometric locking device 120 and the upper and lower housing halves 134, 136, respectively, are water and pressure proof to prevent damage to the units.

Figure 3:
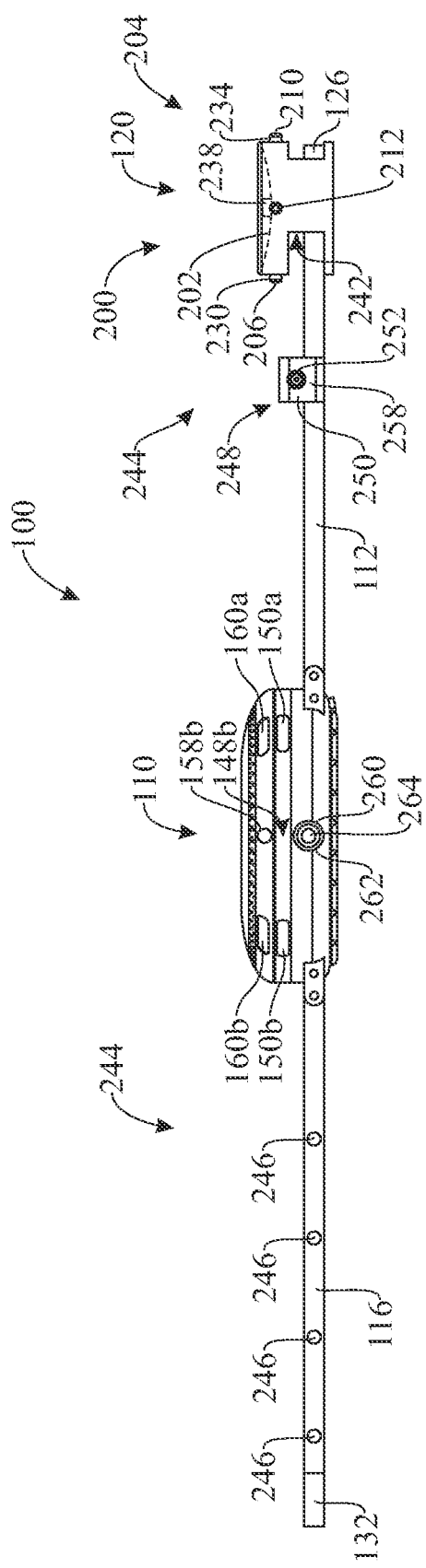
FIG. 3 presents a side elevation view of the secure tracking and monitoring device of FIG. 1.

As best shown in FIGS. 2 and 3, the cylindrical housing 202 of the biometric locking device 120 includes a transverse slot 242 extending through the cylindrical housing 202. The slot 242 is provided to receive the free end 132 of the second band 116 there thorough to secure the second band 116 within the biometric locking device 120 and thus to the wearer's wrist. The securing mechanism within the biometric locking device 120 may be physical such as, but not limited to, pins extending through the holes 194, friction or clamping wheels or opposing moving surfaces which themselves may be mechanically-actuated, hydraulically-actuated, pneumatically-actuated, etc., or may be magnetic, fluid pressurized, etc. Activation by an authorized user fixedly secures the second band 116 within the biometric locking device 120 and deactivation by the authorized user releases the second band 116 from within the biometric locking device 120. Thus, a wearer such as a child or invalid or a perpetrator cannot remove the secure tracking and monitoring device 100 on their own.

It should be noted that the first and second bands 112 and 116 may be formed of a relatively tough or resistant material such as, but not limited to, leather, metallic materials not subject to work hardening, tough polymeric materials resistant to cutting or abrasion or other similar materials not easily broken or cut to further prevent unauthorized removal of the secure tracking and monitoring device 100.

Referring now to FIGS. 3 and 4, in the event the authorized person does not wish to "lock" the secure tracking and monitoring device 100 to the wearer, a separate band securing system 244 is provided. This is necessary when the biometric locking device 120 is in the unlocked or unsecured condition (leaving the second band 116 loose in the slot 242 of the biometric locking device 120) and the wearer still wishes to wear the secure tracking and monitoring device 100 for its tracking and monitoring functions or for any of the functions described hereinbelow associated with the smartwatch 110. I.e., the device 100 includes an anti-removal locking system (biometric locking device 100) which may only be unlocked by an authorized user and, in some embodiments, the device 100 may be secured without activating the anti-removal locking system, such as by securing the band securing system 244, in which case the device 100 may provide a sensory alert indicating the anti-removal locking system has not been activated.

The band securing system 244 generally includes a series of transverse cross-holes 246 formed through the second band 116 and a keeper 248 positioned on the first band 112 between the smartwatch 110 and the biometric locking device 120. The keeper 248 may be fixedly mounted to the first band 112 or may be slidably mounted along the length thereof. With specific reference to the enlarged view of FIG. 4A, the keeper 248 has a slot 250 for receiving the second band 116 (also shown in FIG. 2) therethrough, and a spring mounted plunger 252 for engaging the transverse cross-holes 246 in the second band 116. The spring mounted plunger 252 includes a pin 254 for extending into and out of the cross-holes 246 to secure the second band 116 to the first band 112. A spring 256 is provided around the spring mounted plunger 252 to bias the spring mounted plunger 252 within the keeper 248. The spring mounted plunger 252 extends through a side 258 of the keeper 248 and is selectively alignable with the transverse cross-holes 246 in the second band 116. In use, the free end 132 of the second band 116 is slid through the slot 242 in the biometric locking device 120 and through the slot 250 in the keeper 248. Depression of the spring loaded plunger 252 inserts the pin 254 into one of the transverse cross-holes 246 to releasably secure the second band 116 to the first band 112 and thus the secure tracking and monitoring device 100 to the wrist of the user. It should be noted that anyone can operate the spring loaded plunger 252 to disengage it from the second band 116 and thus remove the secure tracking and monitoring device 100 from the wearer when the biometric locking device 120 is not activated and is thus not secured against unauthorized removal from the wearer.

Referring back to FIG. 3 for the moment, the smartwatch 110 is provided with a panic button 260 on the lower housing half 136 of the smartwatch 110 (alternatively, the panic button could be provided on the upper housing half 134) to provide the wearer with a means for immediately summoning help. The panic button 260 may include a camera and light combination similar to those described hereinabove. The camera and light on the panic button 260 may operate to record the surrounding area when the user/wearer depresses the panic button 260. The camera and light combination may additionally include audio features to further identify the source and/or nature of the danger (e.g., dogs, gunshots, car crash, etc.) or the identity of a perpetrator. Further, the panic button 260 may include a high-intensity light of the LED, laser or other highly concentrated and visible type such that activation of the panic button 260 sends a long or otherwise greatly visible beam of light out from the smartwatch 110 (preferably coordinated in an upward direction) to alert rescuers to the wearers position during distress or even possible water submersion. The panic button 260 may be manually operable by the wearer or may be automatically actuated by the smartwatch 110 and/or the biometric locking device 120.

Pressing the panic button 150a may trigger the biometrics screen, which will allow the wearer or caregiver to place a thumb or index finger on the screen of the device in order to be scanned for verification. When the verification process is completed and there is a match, the 911 dispatcher will notify the police department and assistance will be sent the location where panic button 150a was pressed. Furthermore, when pressing the panic button, the device may emit a loud, disturbing sound which renders it virtually almost impossible to kidnap the wearer without drawing attention, thereby disturbing the perpetrator's plans while giving law abiding citizens time to react by assisting the wearer, and inform 911 dispatchers with live information. The smartwatch 110 may also automatically notify parents, such as via a text or call to their phone (their number may be stored in the smartwatch 110).

Figure 5:
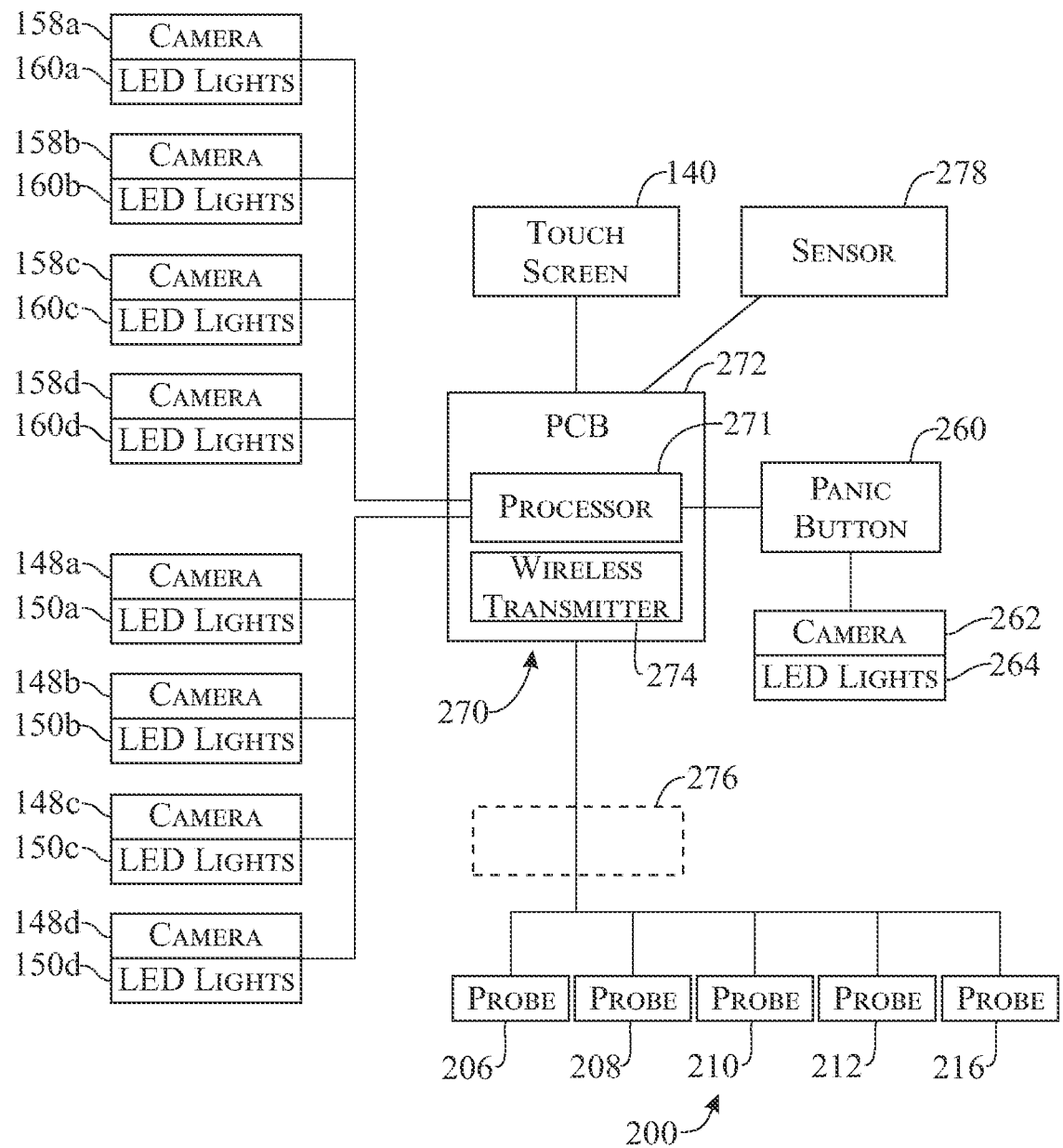
FIG. 5 presents a block diagram of the general components of the secure tracking and monitoring device of FIG. 1.

Turning now to FIG. 5, there is provided a flow chart of the components of the secure tracking and monitoring device 100. At the heart of the system, within the smartwatch 110 is the aforementioned controller 270, which may include one or more processor units 271, which may be provided on a printed circuit board (PCB) 272, and a wireless transmitter 274 which can communicate with outside services such as, but not limited to, parent monitors, cell phones, computers, law enforcement or emergency medical personal services, tracking services, etc. Preferably, the transmitter 274 is a transceiver allowing for bidirectional communication between the wearer and the outside services. Additionally, the transceiver may allow emergency personal or other parties such as good Samaritans to communicate with emergency services to more quickly aid the wearer in times of distress. As shown, the camera/light combinations 148a/150a, 148b/150b, 148c/150c, 148d/150d, 158a/160a, 158b/160b, 158c/160c, and 158d/160d are in communication with the controller 270. Similarly, the panic button 260 and an associated camera 262 and light 264 are in communication with the controller 270.

The controller 270 is operated and programmed through the touch screen control panel 140 of the smartwatch 110. Additionally, as noted hereinabove, the biometric locking device 120 may include a processor 276 in wired or wireless communication with the controller 270 of the smartwatch 110 to connect the series of biometric probes 200, including probes 206, 208, 210, 212 and 216, and their associated series of cameras 204 and lights to the controller 270. Thus, activation information from the biometric locking device 120 along with information and data about unauthorized attempts to remove the biometric locking device 120 from the wearer can be transmitted to authorized personnel through the controller 270 and transmitter 274.

The secure tracking and monitoring device 100 is provided with one or more batteries (not shown) to power the smartwatch 110 and the biometric tracking device 120. A single battery or set of batteries, contained within one of the smartwatch 110 or biometric tracking device 120 may be used where the smartwatch and biometric tracking device 120 are hard wired together. In other embodiments, each of the smartwatch 110 and the biometric tracking device 120 may include its own independent battery. The batteries may be replaceable or rechargeable. The smartwatch 110 may include one or more emergency or backup batteries. When the smartwatch 110 is not charged within an appropriate time, the emergency battery or batteries may power the smartwatch 110 when the remaining one or more batteries run out of power. When charging the smartwatch 110 after utilizing the emergency battery, the smartwatch 110 will need to be charged longer because the emergency battery or batteries will have priority over the main battery or batteries, i.e. shall be charged first.

Figure 6:
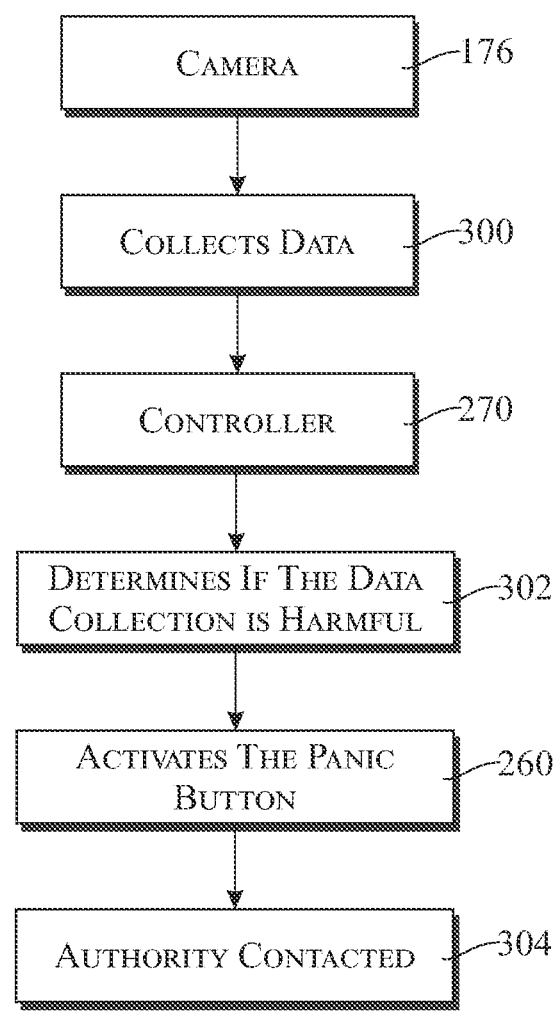
FIG. 6 presents a first flowchart diagram illustrating a first set of safety functions of the secure tracking and monitoring device of FIG. 1.

As shown in FIG. 6, the disclosed camera system, for example camera 158b in the upper housing half 144 of the smartwatch 110, can acquire or collect data 300 and transmit the data to the controller 270 and to a memory comprised for instance in the PCB 272. The program run by the controller 270 may evaluate the data to determine if the observed data is harmful and activate the panic button to both scare off the perpetrator and/or send emergency messages to the proper parties and authorities.

Figure 7:
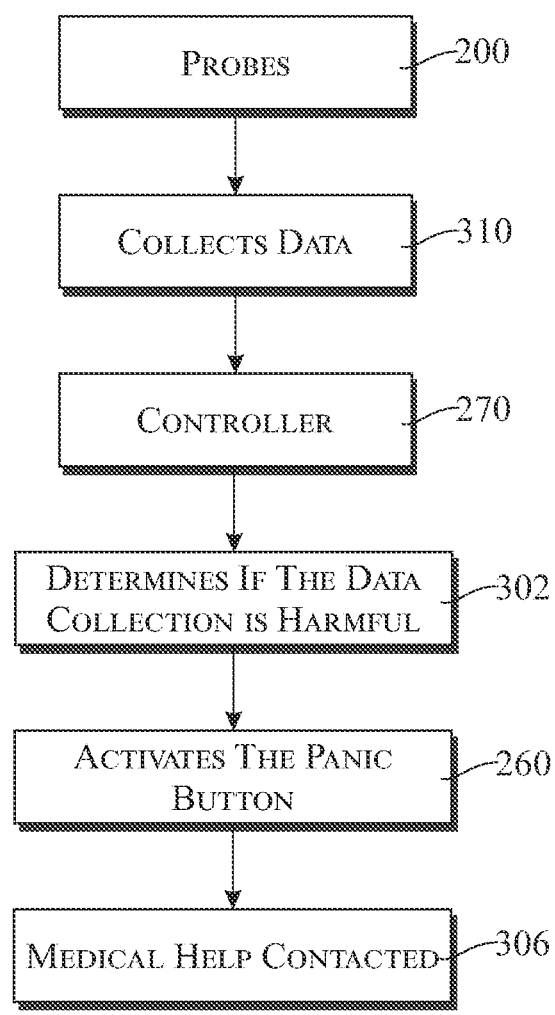
FIG. 7 presents a second flowchart diagram illustrating a second set of safety functions of the secure tracking and monitoring device of FIG. 1.

Likewise, with regard to FIG. 7, when the series of probes 200 on the biometric locking device 120 detect unusual conditions, such as, but not limited to, irregular or elevated heart rate or bodily temperature, higher or lower than normal external temperatures or even water submersions, the data 310 may be sent to the controller 270 and analyzed by the programs run by the controller 270 at step 302. Should the data be of concern, the panic button 260 is activated transmitting the type of distress along with the wearer's location (through the internal GPS or other geolocation module) to the authorities 304 (FIG. 6) or directly to emergency medical help or services 306.

Figure 8:
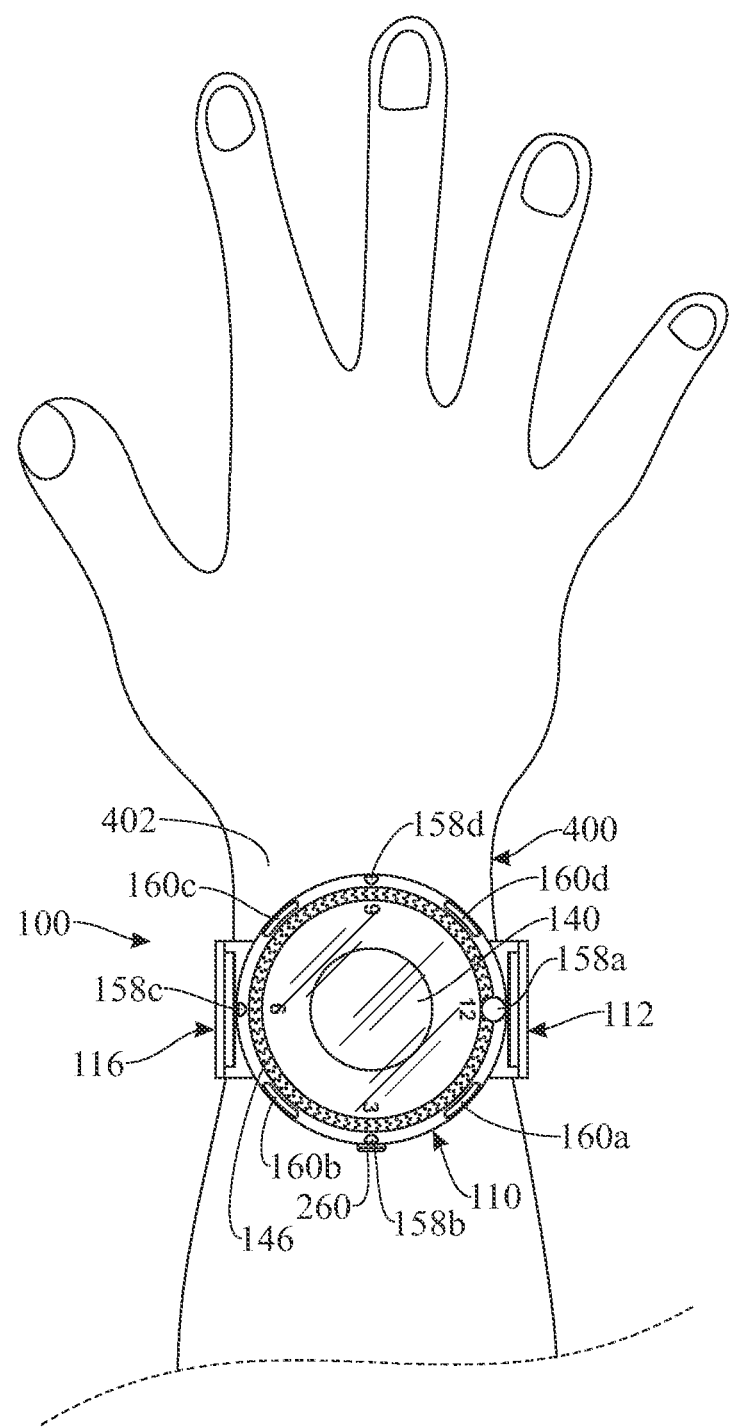
FIG. 8 presents a top view of the secure tracking and monitoring device of FIG. 1 affixed about the wrist of a child.

Turning now to FIG. 8, and also with reference to FIGS. 1-7, in use, the secure tracking and monitoring device 100 can be programmed with various parameters by a parent, guardian, law enforcement personnel, etc., prior to attaching the secure tracking and monitoring device 100, to the child, incapacitated adult or criminal, by use of the control panel 140. Alternatively, prior to use as well as during use, the secure tracking and monitoring device 100 can be programmed with various parameters remotely via a remote terminal utilizing the wireless transmitter/transceiver 274 contained in the smartwatch 110. In an alternative embodiment, the smartwatch 110 and/or the biometric locking device 120 may include a physical connection port for receiving a wired connection to transfer date to and/or from the smartwatch 110 and/or the biometric locking device 120 and/or to charge the one or more batteries comprised in the secure tracking and monitoring device 100.

Once the secure tracking and monitoring device 100 has been prepared for use, it is positioned on the wearer's wrist 400 by placing the smartwatch 110 on the top 402 of the wearer's wrist 400 and wrapping the first and second bands 112 and 116 around the wearer's wrist 400. The free end 132 of the second strap 116 is inserted through the slot 242 in the biometric locking device 120 and pulled so as to be snug around the wearer's wrist 400. The biometric locking device 120 is then activated by authorized personnel to lock the second strap 116 within the biometric locking device 120. As noted above, the secure tracking and monitoring device 100 cannot now be removed from the wearer's wrist 400 except by authorized personnel. Thus, the secure tracking and monitoring device 100 and, in particular, the biometric locking device 120 ensures that the secure tracking and monitoring device 100 will remain on the subject child, incapacitated adult or criminal without fear or concern of unauthorized removal.

Should the authorized personnel not wish to utilize the locking feature, the free end 132 of the second strap 116 may be inserted through the unlocked biometric locking device 120 and through the keeper 248. The keeper 248 can then be operated so as to secure the first band 112 to the second band 116 and thus about the wearer's wrist 400.

Once attached and activated, the secure tracking and monitoring device 100 including the smartwatch 110 and the biometric locking device 120 operate to track the wearer and monitor the wearer's environment through the cameras such as, but not limited to, cameras 158a, 158b, 158c and 158d and lights 160a, 160b, 160c and 160d. The annular ring 146 on the smartwatch 110 can capture the sounds of the surrounding area as well. The biometric locking device 120 monitors the wearer's personal biometric data as well as the environmental conditions surrounding the wearer.

Should any of the data indicated that preprogrammed parameters have been exceeded, the panic button 260 may operate to notify emergency personnel. In this manner, the secure tracking and monitoring device 100 provides a non-removable tracking and monitoring device for the peace of mind of the authorized personnel.

The following are further functions that may be included in the secure tracking and monitoring device 100, as well as emergency situations covered and solutions provided by the secure tracking and monitoring device 100.

Parents can place a boundary of limitations for their children. With GPS or other geolocation capabilities one can enter GLP (Geographical Location Points) to define an area or domain in which a parent will allow their child or dependent to roam. When the child deviates or veers from said area, the smartwatch 110 may notify the parent. The parent or caregiver may also set a perimeter RAM (Restricted Area of Movement) or an APP (Allowed Perimeter of Play) which allows the child or other wearer to move within a specific area within a boundary defined by several GLPs. As the wearer deviates from course, the secure tracking and monitoring device 100 begins to light up. The more the child or wearer deviates from course, the more sections may light up and emitted sounds may intensify, the sound created to impel the child or wearer to return to assigned location. Sound can only be deactivated by returning to the RAM. Furthermore, Grace Period Allowed (GPA) lights may flash on the secure tracking and monitoring device 100. GPA can be set by parents to allow their child to arrive to a desired location before RAM is enforced. After GPA has expired, the secure tracking and monitoring device 100 will enforce GLPs and RAMs (e.g.: GPA of 30 minutes).

Defining a perimeter allows the parent or caregiver to keep the child or wearer in a preset range. When the child or wearer child goes out of that range, both parties are alerted—parent and child). The child or wearer will hear a default message that is installed by PV or parents can record their own alert message. A father can record his own alert message so when his children are with him, they hear his voice; the mother can do the same, device will know which voice to activate by the mobile device that places the restrictions.

Trust plans may be created, consisting in setting a point object to be reached by the child or wearer that will give them more room to maneuver. When the child or wearer deviates, points are deducted. Long periods of time without deviation will increase points, until a goal is reached by which the child or wearer is able or allowed to roam without any restriction or boundaries (while movement is preferably still monitored).

Through a GPS or other geolocation tracking system, if a child has lost sight of their parent (e.g., in an amusement park), the child can easily locate their parents by making a selection on the device that will guide them straight to their parents. In turn, parents may also activate a feature on their smartphones that can direct them to the smartwatch 110 worn by their child.

The smartwatch 110 may provide live messaging or live correspondence, which may be done at any time from an individual identified as parent to an individual in possession of the smartwatch 110.

The smartwatch 110 may provide or contain pre-recorded messages. A parent or caregiver can have pre-recorded voice messages setup for specific time, date, and/or month that are heard by a child or wearer of the device (e.g., a pre-recorded message configured to play Mondays through Fridays at 3 p.m., "JJ, do your homework"). This may allow the child to feel the parent's presence in their absence.

A screen display button may be included, to allow to control which contents are displayed on the screen or control panel 140 (e.g., an analog or digital time, camera image(s), or any image, such as a cartoon character).

In addition to functionalities described herein, the smartwatch 110 preferably allows the wearer to make and receive calls, and may optionally store a set of contacts. Thus, the device may provide the child or wearer with a reliable line of communication to his or her parents.

In some embodiments, the smartwatch 110 may include a space or portal for housing a SIM card. The portal for the SIM card may be located in the back of the smartwatch 110. For example, a user-operable control or lever may be provided, such that when a user operates the control or lowers the lever, the portal is opened, and a SIM card can be inserted or removed. When completely inserted, the user can hear a click which informs the user that the card has been inserted correctly and is secure.

The cameras disclosed herein may provide the parent or caregiver with a 360-degree view, which may include visuals of the child or wearer to insure their physical well-being.

Cameras may provide a live feed to the remote parent or caregiver, such as via video call.

Identification tags may be placed on the phone, allowing others to see the child or wearer's first and last name, parent or caregiver's number, and home address, for instance and without limitation.

The secure tracking and monitoring device 100 may include a "buddy" system that may allow a user to verify if a child or wearer deviates from another subject (e.g., a buddy) carrying a similar device 100 a distance greater than a predetermined distance, in which case the secure tracking and monitoring device 100 of the child will automatically notify the parent of said occurrence.

The secure tracking and monitoring device 100 may further include a "home sweet home" function, by which, if the child or wearer ever gets lost, the secure tracking and monitoring device 100 guides the child or wearer back home, or to any another address programmed into the device for said purposes). Guidance may be carried out with audio and/or visual instructions.

The bands 112, 116 may be metal working (flexible, durable, and heavy-duty strength) and prevent the child or violator/stranger from easily severing the bands 112, 116. When one of the bands 112 or 116 is severed, parents are immediately notified.

The invention may further include a platform which allows a parent or caregiver to create an account that allows the child or wearer to make emergency purchases when not in the possession of cash by waving the device by credit/debit scanners. The parent or caregiver will be allowed to instantly deposit funds into the device's account.

The secure tracking and monitoring device 100 may further include a Car Alert within Range System, which notifies the child or wearer of the device that there is a motor vehicle that is in motion and is approaching, and is too close in range. Vehicles may include built in features and or add-ins configured to transmit warning signals to the secure tracking and monitoring device 100.

The secure tracking and monitoring device 100 may further include a "zap" function, by which a parent or caregiver may activate a setting that zaps the child or wearer of the smartwatch 110 when the wearer deviates from an assigned destination. The setting can be set at different intervals (e.g., 30 seconds, 1 minute, 5 minutes, once, or at parent or caregiver's discretion).

The secure tracking and monitoring device 100 can include an internal thermometer and may be configured to notify parents or caregivers when the child or wearer is in an atmosphere that is too hot and can be fatal for him or her. Parents may be notified at different intervals/increments approaching fatal levels. In some embodiments, the secure tracking and monitoring device 100 may be configured to communicate with an air conditioning system and activate air conditioning; for example, the secure tracking and monitoring device 100 may be configured to communicate with a vehicle on-board computer system and activate a vehicle A/C, in addition to having parents and/or authorities notified.

The secure tracking and monitoring device 100 may let a parent or caregiver know when the device has been submerged in water and how deep. The device may provide the parent or caregiver with a warning if the device is submerged for too long.

In some embodiments, the secure tracking and monitoring device 100 may be configured to locate other children that are wearing similar devices that are at establishment of pastime/leisure (e.g., a community center, park, etc.). Results can be tailored to general (all), or to a specific race, gender, and/or age.

In some embodiments, information relative to registered sexual predators may be uploaded onto a database in preferably wireless communication with the secure tracking and monitoring device 100 via a computer network (e.g., the Internet). The secure tracking and monitoring device 100 may alert the child or wearer when they are near a predator's residence. In some embodiments, sexual predators may wear a device that allows law enforcement to track and locate them, and transmit said information to the secure tracking and monitoring device 100, which may in turn inform the wearer that a sexual predator is in the vicinity.

In some embodiments, the parent or caregiver may carry a smartphone running a software application configured to inform the parent or caregiver when the child or wearer of the secure tracking and monitoring device 100 has left school grounds (the device may record the time) and if/when the child returned.

In some embodiments, the secure tracking and monitoring device 100 may notify the child and may also send a notification to an electronic device carried by the parent when the child is in an area that has a high crime/murder rate or danger zone.

In some embodiments, the secure tracking and monitoring device 100 may be configured to find siblings or friends wearing a similar device when they have lost sight from each other (e.g., at a fair). In order to activate this function, the siblings or friends may first scan each other's devices via Bluetooth® or other communications protocol, after which the devices may monitor each other.

In some embodiments, the secure tracking and monitoring device 100 may make a child's report card instantly available to parents. Parents can view grades via their phones by accessing data stored on the secure tracking and monitoring device 100. A request may be made to the school their child is attending to post grades onto the secure tracking and monitoring device 100 through a software application on their phones that allows them to enter the subject, grade, and any comments. Information can be viewed on the secure tracking and monitoring device 100 and/or it may be orally given to the parents.

In some embodiments, the secure tracking and monitoring device 100 may store audio files such as sing-alongs.

In some embodiments, the secure tracking and monitoring device 100 may be configured to allow a child or wearer to easily establish an audio or video call with a remote counselor or teacher which may help the child with their math, reading, pronouncing, etc.

The parents may communicate with their child at a push of a button to provide their child with some redirection when misbehaving in school, teacher facilitates the process. In some embodiments, this communication may only take place with the permission of the teacher, and may further allow the teacher to inform parents of the child's behavior (if parent is available).

In some embodiments, when pressing the panic button, the secure tracking and monitoring device 100 is configured to detect whether the wearer's heartbeat is beating at a rate above normal rate, and responsively contact medical assistance.

In some embodiments, partnering businesses, amusement parks, and other child friendly orientated facilities may have a device located on their premises that allows the child wearing the secure tracking and monitoring device 100 to know where all the other children are at "Hot Spot".

In some embodiments, the smartwatch 110 may be waterproof and may be configured to alert parents when submerged too long under water. Furthermore, the device may be configured to measure outside pressure and may inform the parents of the underwater depth of the device.

In some embodiments, the secure tracking and monitoring device 100 may allow an individual to notify a person who is a part a social network in order for said person to come and remove them from a negative situation and give positive advice (consultation). The situation may be school-related, such as having to do with during, before, and after school programs. The smartwatch 110 may alert the wearer when others forming part of said social network are near or in front of the wearer.

In some embodiments, the secure tracking and monitoring device 100 may be configured to project images and/or lights, such as including an animated silhouette or silhouette slideshow.

In some embodiments, the secure tracking and monitoring device 100 may monitor the wearer's heart rate, and may detect whether the wearer is lying down and possibly sleeping. For instance, the secure tracking and monitoring device 100 may include a Heart Rate Identifying Mechanism (HRIM) and/or one or more sensors configured to detect a lack of movement.

The secure tracking and monitoring device 100 may be configured to detect steps, and may inform the parent or caregiver of how many steps their child has taken through the course of a day. On their smartphone, computer or other electronic device, the parent can access their user account and enter meals consumed by the child for the day and receive the amount of steps needed in order to burn the unnecessary fat/calories and remains healthy.

The secure tracking and monitoring device 100 may further include an alarm system which allows the parent to set up a preprogrammed voice alarm sound which alerts the child or wearer to carry out an action, such as to be somewhere or do something.

In some embodiments, the secure tracking and monitoring device 100 may be configured to detect when wearer of the secure tracking and monitoring device 100 is dehydrated.

In some embodiments, the secure tracking and monitoring device 100 may be configured to detect how long the wearer is lying down without movement. For instance, if an elderly parent is in a nursing home, a son or daughter may fit the parent with the secure tracking and monitoring device 100 and configure the device to inform them how long the parent remains still while lying down without moving; such the monitored time exceed a predetermined threshold, the secure tracking and monitoring device 100 may send an alert to the son or daughter's phone warning them that an excessive length of time without movement may be causing bed sores, in order for the son/daughter to address the problem as soon as possible.

The secure tracking and monitoring device 100 may further include a "talk and text" feature that allows the child or wearer to speak into the device, such that the secure tracking and monitoring device 100 detects said speech, translates it into text, and submits the text to an intended receiver.

In some embodiments, the secure tracking and monitoring device 100 may be configured to analyze blueprints from exact directions within a building. A software program may upload and process all blueprints instantly.

In some embodiments, the secure tracking and monitoring device 100 may include a "slip-and-fall" detection system to provide slip and fall detection. The device may one or more sensors 278, such as, but not limited to, an accelerometer or other movement sensor configured to detect rapid acceleration (e.g., a slip) and/or deceleration (e.g., a fall or impact), a proximity sensor configured to detect a fall or impact against a surface, for instance and without limitation, and/or other applicable sensor(s). The device may be configured to notify an external device or user of such detections, such as by emitting a visible and/or audible signal, and/or by transmitting an electromagnetic signal to said external electronic device, for instance and without limitation. The movement sensor may be operatively coupled, for instance, to the processor unit 271 shown in FIG. 5.

In some embodiments, the secure tracking and monitoring device 100 may include a shock or contact detection system configured to detect when the wearer's hand has come into contact with an object. For instance, the shock or contact detection system may comprise a proximity sensor, an accelerometer, and/or other applicable sensor(s). The device may be configured to alert the wearer, such as by a continuous or discontinuous (e.g., flashing) light pattern emitted by one or more of the device lights, an audible signal emitted by the device speaker(s), or another sensory signal (e.g., a vibration) that the wearer needs to wash their hands. The lights may illuminate in different colors (e.g., green, yellow, and red) to indicate different levels of shock absorption. The device may be adjustable to allow the user, parents or caregiver to select the level of shock absorption to determine how long a contact must last, and/or how many different contacts must be detected, before the device emits a sensory notification to instruct or remind the wearer to wash their hands.

In some embodiments, the secure tracking and monitoring device 100 may include a body-movement-monitoring system configured to monitor overall body movement, such as to prevent the formation of bedsores or pressure ulcers in the event that the wearer of the secure tracking and monitoring device 100 is bedridden, required to use a wheelchair, or the like. The body-movement-monitoring system may include an accelerometer or other movement sensor configured to detect movement of the device 100 and thereby of the wearer of the device 100.

The body-movement-monitoring system provides data pertaining to the degree of movement of the wearer of the device. The progress of, or increased severity of, the pressure ulcers can be tracked; the tracked data, or data generated by the body-movement-monitoring system may be stored by the device 100 and/or transmitted to an external electronic device, whether directly (e.g., via a wired connection, such as USB, or a wireless connection, such as Bluetooth, Wi-Fi or other wireless protocols) or indirectly (e.g., over a computer network such as the Internet, to which the device 100 may be wiredly or wirelessly connected). The external electronic device may include a phone, computer, tablet, etc., and may run a software application (e.g., an installed program, a web browser, etc.) configured to access the tracked data and display said data, such as in chart-like forms. Settings for notification can be set for 5, 10, or 15-minute intervals, for instance and without limitation. Information pertaining to the user's skin conditions can be placed into profile-associated files which may be stored on the device 100 and/or in an external electronic device. The body-movement-monitoring system is configured to apply a skin risk assessment and assign a level or "preferred" setting, causing the device 100 to enter a default setting tailored to risk level (the caregiver/parent may still be able to alter the setting). The device 100 may emit a sensory alarm and/or transmit an alarm signal to an external electronic device associated, for instance, to the caregiver/parent every time the wearer of the device 100 is not shifted in a timely manner. The body-movement-monitoring system may be configured to provide continuous notifications/alerts until the individual or wearer of the device 100 has met applicable medical requirements.

In some embodiments the method or methods described above may be executed or carried out by a computing system including a tangible computer-readable storage medium, also described herein as a storage machine, that holds machine-readable instructions executable by a logic machine (i.e. a processor or programmable control device) to provide, implement, perform, and/or enact the above described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI) or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard or gaming controller. For example, a user input may indicate a request that certain task is to be executed by the computing system, such as requesting the computing system to display any of the above described information, or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A secure tracking and monitoring device, wearable on a wrist, the device comprising:
    a watch;
    a first band comprising a first end and an opposite, second end, with the first end of the first band attached to said watch;
    a second band comprising a first end and an opposite, second end, with a first end of the second band attached to said watch;
    a first plurality of cameras disposed in spaced-apart relationship about a periphery of the watch;
    one or more lights configured to illuminate a field of view of the first plurality of cameras;
    a first plurality of lights configured to illuminate a field of view of the first plurality of cameras, wherein each light of the first plurality of lights arranged between a respective pair of adjacent cameras of the first plurality of cameras;
    a biometric locking device comprising one or more biometric sensors configured to detect a biometric characteristic of a subject and responsively generate a biometric input, and one or more locking actuators configured to selectively adopt a locked position in which the one or more locking actuators disconnectably attach the second end of the first band to the second end of the second band and an unlocked position in which the one or more locking actuators do not attach the second end of the first band to the second end of the second band; and
    at least one controller comprising at least one processor and at least one memory, wherein the at least one memory stores processor-executable instructions configured to cause the at least one processor to execute the operations of:
        receiving a biometric input generated by the one or more biometric sensors;
        comparing said received biometric input with a specific biometric input stored in the memory, said specific biometric input corresponding to an authorized subject; and
        if said received biometric input matches said specific biometric input, operating said one or more locking actuators to switch between the locked position and the unlocked position.

2. The device of claim 1, wherein the one or more biometric sensors are configured to detect at least one of a fingerprint, a face, an image, a retina, a barcode, and a voice.

3. The device of claim 1, wherein the one or more biometric sensors comprise at least one biometric sensor on the watch.

4. The device of claim 1, wherein the one or more biometric sensors comprise at least one biometric sensor at the second end of the second band.

5. The device of claim 4, wherein the biometric locking device comprises a housing at the second end of the second band, the housing comprising said at least one biometric sensor.

6. The device of claim 5, wherein said at least one biometric sensor comprises a plurality of cameras arranged around the housing.

7. The device of claim 5, wherein the at least one biometric sensor comprises a plurality of biometric sensors arranged around the housing.

8. The device of claim 5, wherein the at least one biometric sensor comprises a top central camera comprised at a top, central area of the housing.

9. The device of claim 5, wherein the at least one biometric sensor comprises a top central biometric sensor comprised at a top, central area of the housing.

10. The device of claim 5, wherein at least one biometric sensor of the one or more biometric sensors is located at a top, recessed surface of the housing.

11. The device of claim 1, further comprising a keeper carried by the second band, the keeper configured to secure the first band to the second band independently of the biometric locking device.

12. The device of claim 11, wherein the keeper comprises a spring-loaded rod configured to selectively couple with a plurality of openings formed along the first band.

13. The device of claim 1, wherein the watch further comprises a second plurality of cameras and a second plurality of lights disposed in spaced-apart relationship about a periphery of the watch, each light of the second plurality of lights arranged between a respective pair of adjacent cameras of the second plurality of cameras, wherein the second plurality of lights and second plurality of cameras are arranged in vertical alignment and below the first plurality of lights and first plurality of cameras, respectively, and further wherein the first plurality of cameras are oriented upward and radially outward of the watch and the second plurality of cameras are oriented radially outward of the watch.

14. The device of claim 1, wherein the watch further comprises a screen and an annular speaker output disposed around the screen.

15. The device of claim 1, further comprising at least one wireless transceiver providing wireless digital communication between the at least one controller and an external electronic device.

16. A secure tracking and monitoring device, wearable on a wrist, the device comprising: a watch;
- a first band comprising a first end and an opposite, second end, with the first end of the first band attached to said watch;
- a second band comprising a first end and an opposite, second end, with a first end of the second band attached to said watch;
- a biometric locking device comprising one or more biometric sensors configured to detect a biometric characteristic of a subject and responsively generate a biometric input, and one or more locking actuators configured to selectively adopt a locked position in which the one or more locking actuators disconnectably attach the second end of the first band to the second end of the second band and an unlocked position in which the one or more locking actuators do not attach the second end of the first band to the second end of the second band, wherein the one or more biometric sensors comprise at least one biometric sensor at the second end of the second band; and
- at least one controller comprising at least one processor and at least one memory, wherein the at least one memory stores processor-executable instructions configured to cause the at least one processor to execute the operations of:

receiving a biometric input generated by the one or more biometric sensors;

comparing said received biometric input with a specific biometric input stored in the memory, said specific biometric input corresponding to an authorized subject; and if said received biometric input matches said specific biometric input, operating said one or more locking actuators to switch between the locked position and the unlocked position; and further wherein the watch comprises:
- a first plurality of cameras and a first plurality of lights disposed in spaced-apart relationship about a periphery of the watch, each light of the first plurality of lights arranged between a respective pair of adjacent cameras of the first plurality of cameras, and
- a second plurality of cameras and a second plurality of lights disposed in spaced-apart relationship about a periphery of the watch, each light of the second plurality of lights arranged between a respective pair of adjacent cameras of the second plurality of cameras, wherein the second plurality of lights and second plurality of cameras are arranged in vertical alignment and below the first plurality of lights and first plurality of cameras, respectively, and further wherein the first plurality of cameras are oriented upward and radially outward of the watch and the second plurality of cameras are oriented radially outward of the watch.

* * * * *